(12) United States Patent
Scalf et al.

(10) Patent No.: US 12,446,120 B2
(45) Date of Patent: Oct. 14, 2025

(54) MOUNTING ARRANGEMENT FOR OVER-THE-RANGE COOKING APPLIANCE

(71) Applicant: Midea Group Co., Ltd., Foshan (CN)

(72) Inventors: Eric Scalf, Louisville, KY (US); Brian Langness, Shelbyville, KY (US); Daniel J. Trice, Louisville, KY (US); Guo Jun Zhang, Louisville, KY (US); Jared Speichinger, Ballwin, MO (US)

(73) Assignee: Midea Group Co., Ltd., Guangdong (CN)

( * ) Notice: Subject to any disclaimer, the term of this patent is extended or adjusted under 35 U.S.C. 154(b) by 0 days.

(21) Appl. No.: 18/400,809

(22) Filed: Dec. 29, 2023

(65) Prior Publication Data

US 2024/0147584 A1    May 2, 2024

Related U.S. Application Data

(63) Continuation of application No. 17/089,196, filed on Nov. 4, 2020, now Pat. No. 11,864,296.

(51) Int. Cl.
| | | |
|---|---|---|
| *H05B 6/80* | (2006.01) | |
| *A47B 77/08* | (2006.01) | |
| *H05B 6/64* | (2006.01) | |

(52) U.S. Cl.
CPC .......... *H05B 6/6429* (2013.01); *A47B 77/08* (2013.01)

(58) Field of Classification Search
CPC .............................. H05B 6/6429; A47B 77/08
See application file for complete search history.

(56) References Cited

U.S. PATENT DOCUMENTS

| | | | |
|---|---|---|---|
| 2,739,521 A | | 3/1956 | Spear |
| 3,627,248 A | * | 12/1971 | Nelson ................... A63B 55/10 |
| | | | 248/222.51 |

(Continued)

FOREIGN PATENT DOCUMENTS

| | | |
|---|---|---|
| AT | 411925 B | 7/2004 |
| CN | 1704653 A | 12/2005 |

(Continued)

OTHER PUBLICATIONS

Namay, Daniel Elliot, Non-Final Office Action issued in U.S. Appl. No. 17/353,671, 218 pages, dated Jan. 18, 2024.

(Continued)

*Primary Examiner* — Amy J. Sterling
(74) *Attorney, Agent, or Firm* — Gray Ice Higdon

(57) ABSTRACT

An over-the-range cooking appliance for mounting to an underside of a wall cabinet, where the cooking appliance includes: an enclosure with a cooking cavity for food and where the enclosure includes at least a rear-facing side and a top-facing side; a wall bracket configured to be secured to the wall near the wall cabinet and configured to support the enclosure; and a cabinet bracket to support the enclosure from the underside of the wall cabinet. The cabinet bracket includes a first and second cooperating latch member, where the first cooperating latch member is mounted on the underside of the cabinet and the second cooperating latch member is mounted on the top-facing side of the enclosure. The cooperating latch members are respectively configured to latch to one another when the enclosure is supported on the wall bracket proximate the bottom of the rear-facing side thereof and tilted upwardly.

7 Claims, 10 Drawing Sheets

(56) References Cited

U.S. PATENT DOCUMENTS

| | | | |
|---|---|---|---|
| 3,804,211 A | 4/1974 | Scherzinger | |
| 3,814,363 A | 6/1974 | Brelosky | |
| 3,954,244 A | 5/1976 | Gopstein | |
| 3,970,273 A | 7/1976 | Tanner | |
| 4,012,058 A | 3/1977 | Patton | |
| 4,327,274 A | 4/1982 | White et al. | |
| 4,453,690 A * | 6/1984 | Takeuji | A47B 95/008 248/309.1 |
| 4,457,436 A * | 7/1984 | Kelley | A47B 95/008 312/246 |
| 4,465,256 A | 8/1984 | Wolbrink et al. | |
| 4,580,853 A | 4/1986 | Hitzeroth et al. | |
| 4,635,615 A | 1/1987 | Itoh et al. | |
| 4,659,047 A | 4/1987 | Haller | |
| 4,666,113 A | 5/1987 | Itoh et al. | |
| 4,720,622 A * | 1/1988 | Iwata | F24C 15/30 219/391 |
| 4,753,406 A | 6/1988 | Kodama et al. | |
| 4,795,121 A | 1/1989 | Comito | |
| 4,796,850 A * | 1/1989 | Aramaki | F24C 15/30 248/674 |
| 4,824,061 A * | 4/1989 | Sumikama | H05B 6/666 248/225.21 |
| 4,898,149 A | 2/1990 | Cohn | |
| 5,014,945 A | 5/1991 | Miller | |
| 5,096,230 A | 3/1992 | Pausch et al. | |
| 5,257,468 A | 11/1993 | Lebrun | |
| 5,318,328 A | 6/1994 | Dawson | |
| 5,482,232 A * | 1/1996 | Wynn | A47B 81/06 248/222.51 |
| 5,676,440 A | 10/1997 | Garber et al. | |
| 6,018,158 A | 1/2000 | Kang | |
| 6,222,171 B1 * | 4/2001 | Fukuda | F24C 15/30 219/757 |
| 6,341,754 B1 | 1/2002 | Melito et al. | |
| 6,369,372 B1 * | 4/2002 | Kim | H05B 6/6429 219/757 |
| 6,512,214 B2 | 1/2003 | Jeong et al. | |
| 6,554,880 B1 | 4/2003 | Northcutt | |
| 6,584,702 B2 | 7/2003 | Irey | |
| 6,660,984 B1 | 12/2003 | Jeong et al. | |
| 6,737,622 B1 | 5/2004 | Jeong et al. | |
| 6,894,259 B2 | 5/2005 | Lee | |
| 6,894,260 B2 * | 5/2005 | Yamauchi | H05B 6/6429 219/757 |
| 7,030,348 B1 | 4/2006 | Kim | |
| 7,129,452 B2 * | 10/2006 | Cho | H05B 6/6429 219/757 |
| 7,282,683 B2 | 10/2007 | Yamauchi et al. | |
| 7,348,527 B2 | 3/2008 | Braunisch | |
| 9,243,734 B2 | 1/2016 | Aubert et al. | |
| 9,719,251 B2 | 8/2017 | Gosling | |
| 9,897,330 B2 | 2/2018 | Bruin-Slot et al. | |
| 9,897,331 B2 | 2/2018 | Zachary | |
| 10,018,365 B2 | 7/2018 | Bruin-Slot et al. | |
| 10,145,054 B2 | 12/2018 | Federico | |
| 10,197,202 B2 | 2/2019 | Vasquez | |
| 10,302,308 B2 * | 5/2019 | Peng | F24C 15/2021 |
| 10,317,093 B2 | 6/2019 | Bruin-Slot et al. | |
| 10,539,329 B2 | 1/2020 | Gauthier et al. | |
| 10,633,783 B1 | 4/2020 | Kelley | |
| 10,660,438 B2 | 5/2020 | Hognaland | |
| 10,663,175 B2 | 5/2020 | Jang | |
| 10,709,240 B2 | 7/2020 | Hira et al. | |
| 11,460,193 B2 | 10/2022 | Gayakwad | |
| 11,864,296 B2 | 1/2024 | Scalf et al. | |
| 2005/0052018 A1 | 3/2005 | Pichotta | |
| 2005/0178763 A1 | 8/2005 | Yamauchi | |
| 2009/0252548 A1 | 10/2009 | Laible | |
| 2016/0003270 A1 | 1/2016 | Franklin | |
| 2016/0195279 A1 | 7/2016 | Naber | |
| 2016/0341432 A1 | 11/2016 | Sinur | |
| 2017/0065077 A1 | 3/2017 | Behroozi | |
| 2018/0192807 A1 * | 7/2018 | Hall | A47B 96/1416 |
| 2018/0340695 A1 | 11/2018 | Park | |
| 2019/0113241 A1 | 4/2019 | Zhang et al. | |
| 2019/0203881 A1 | 7/2019 | Wu | |
| 2019/0223593 A1 | 7/2019 | Hira | |
| 2020/0224676 A1 | 7/2020 | Gazerro | |
| 2020/0292291 A1 * | 9/2020 | Duz | G01B 3/14 |
| 2020/0373743 A1 * | 11/2020 | Chambers | H01R 13/5213 |
| 2022/0141927 A1 | 5/2022 | Scalf et al. | |
| 2022/0400850 A1 | 12/2022 | Trice | |
| 2022/0400860 A1 | 12/2022 | Trice | |
| 2022/0404030 A1 | 12/2022 | Trice | |
| 2022/0404031 A1 * | 12/2022 | Trice | F24C 15/20 |
| 2023/0404260 A1 | 12/2023 | Trice et al. | |

FOREIGN PATENT DOCUMENTS

| | | |
|---|---|---|
| CN | 108344018 A | 7/2018 |
| CN | 210241107 U | 4/2020 |
| DE | 3839931 A1 | 5/1990 |
| DE | 4340255 A1 | 6/1995 |
| DE | 10128026 A1 | 12/2002 |
| DE | 10357575 A1 | 7/2004 |
| DE | 102005057153 A1 | 5/2007 |
| DE | 102005057160 A1 | 5/2007 |
| DE | 102010055986 A1 | 5/2012 |
| EP | 0130029 A1 | 1/1985 |
| GB | 2142669 A | 1/1985 |
| KR | 880000748 Y1 | 3/1988 |
| KR | 880002241 Y1 | 6/1988 |
| KR | 19980030344 U | 8/1998 |
| KR | 19980030345 U | 8/1998 |
| KR | 19980036833 U | 9/1998 |
| KR | 19980045009 U | 9/1998 |
| KR | 19990032462 A | 5/1999 |
| KR | 20000010025 A | 2/2000 |
| KR | 100244311 B1 | 3/2000 |
| KR | 20010055487 A | 7/2001 |
| KR | 200271639 Y1 | 4/2002 |
| KR | 20030059878 A | 7/2003 |
| KR | 20070065133 A | 6/2007 |
| KR | 20080057729 A | 6/2008 |
| KR | 20110002949 U | 3/2011 |
| WO | 2017037247 A1 | 3/2017 |

OTHER PUBLICATIONS

Bargero, John E., United States Patent and Trademark Office, Final Office Action issued in U.S. Appl. No. 17/353,666, 36 pages, dated May 14, 2024.

Tran-Le, Thao Uyen, United States Patent and Trademark Office, Final Office Action issued in U.S. Appl. No. 17/353,647, 51 pages, dated Aug. 15, 2024.

Bargero, John E., United States Patent and Trademark Office, Non-Final Office Action issued in U.S. Appl. No. 17/353,666, 40 pages, dated Sep. 29, 2024.

Salone, Bayan, United States Patent and Trademark Office, Notice of Allowance issued in U.S. Appl. No. 18/210,983, 71 pages, dated Sep. 30, 2024.

Majestic, Majestic BKTLA7C LED TV Wall Mount Slide Bracket for Easy TV Removal, Retrieved from: https://majesticelectronics.us/tv-mounts/16-majesetic-bktla7c-led-tv-wall-mount-bracket-easy-remove.html , Retrieved on Oct. 27, 2020.

MagVent, MagVent MV-90 Magnetic Dryer Vent Coupling, Amazon.com, Retrieved from https://www.amazon.com/MagVent-MV-90-Magnetic-Dryer-Coupling/dp/B013TI7A4S, Retrieved on Dec. 9, 2020.

MagVent, MagVent Dryer Vent, Retrieved from: https://www.magvent-dryervent.com/, Retrieved on Apr. 7, 2021.

Nardi, Tom, 3D Printed Magnetic Dust Port Keeps Shop Clean, Hackaday, Aug. 29, 2018.

Transmittal of Related Applications dated Dec. 29, 2023.

Fulton Store, Side Mount Heavy Duty Steel Furniture Leg Leveling Feet, Adjustable Height with Round Foot Ideal for Desks, Tables, Shelving Units, Shop Cabinets and Furniture, retrieved from: https://

(56) References Cited

OTHER PUBLICATIONS www.amazon.com/Adjustable-Furniture-Levelers-Shelving-Cabinets/dp/B06ZXSXL5Z, Retrieved on: Jun. 9, 2023.
Mason Ind., 20,000 lb Capacity, 3-1/2 Wide x 6" Long, 1/2" Pad, Wedge Jack, retrieved from: https://www.mscdirect.com/product/details/88000906; Retrieved on: Jan. 30, 2023.
Wobble Wedges Store, Wobble Wedge BigGap Rigid Plastic Shims, Multipurpose Wdges for Home Improvement & Work, Leveling Pads for Large Gaps & Heavy Loads, Furniture Appliance Levelers, Retrieved from: https://www.amazon.com/Wobble-Wedges-BigGap-Plastic-Shims/dp/B08KVV6JRM?th=1; Retrieved on: Jan. 30, 2023.
Sterling, Amy Jo., United States Patent and Trademark Office, Notice of Allowance issued in U.S. Appl. No. 17/089,196, 46 pages, dated Aug. 2, 2023.
Bargero, John E., United States Patent and Trademark Office, Non-Final Office Action issued in U.S. Appl. No. 17/353,666, 53 pages, dated Nov. 6, 2023.
Salone, Bayan, United States Patent and Trademark Office, Notice of Allowance issued in U.S. Appl. No. 17/353,654, 150 pages, dated Apr. 10, 2024.
Tran-Le, Thao Uyen, Non-Final Office Action issued in U.S. Appl. No. 17/353,647, 111 pages, dated Apr. 26, 2024.

\* cited by examiner

MOUNTING ARRANGEMENT FOR OVER-THE-RANGE COOKING APPLIANCE

BACKGROUND

Cooking appliances, and in particular microwave cooking appliances, are commonly used for residential cooking, and are often installed over a range or cooktop. The installation of cooking appliance over a range or cooktop is a lengthy process and often requires two individuals to complete. Furthermore, installation of these units may necessitate drilling many holes into the surrounding cabinetry. During installation of a typical over-the-range cooking appliance, a first individual may be required to hold the appliance in position underneath a wall cabinet while a second individual drives several mounting screws through the wall cabinet from within the interior of the wall cabinet. Such an operation may also be complicated by the need to locate and properly align the mounting screws with corresponding apertures in the top of the cooking appliance while the cooking appliance is pushed up against the underside of the cabinet.

Accordingly, a need continues to exist in the art for a manner of simplifying mounting of an over-the-range cooking appliance, and in some instances, allowing for a single individual to install a cooking appliance over a range or cooktop.

SUMMARY

The herein-described embodiments address these and other problems associated with the art by providing an over-the-range cooking appliance that is configured for mounting to an underside of a wall cabinet, where the over-the-range cooking appliance includes: an enclosure with a cooking cavity to receive food, where the enclosure includes at least a rear-facing side and a top-facing side; a wall bracket configured to be secured to a wall and configured to support the enclosure proximate a bottom of the rear-facing side of the enclosure; and a cabinet bracket to support the enclosure from the underside of the wall cabinet, the cabinet bracket including first and second cooperating latch members, the first cooperating latch member mounted on the underside of the wall cabinet and the second cooperating latch member mounted on the top-facing side of the enclosure, where the first and second cooperating latch members latch to one another when the enclosure is supported on the wall bracket proximate the bottom of the rear-facing side thereof and tilted upwardly to inhibit downward tilting of the enclosure after the first and second cooperating latch members are latched to one another.

In a first aspect, an over-the-range cooking appliance configured for mounting to an underside of a wall cabinet is disclosed, the over-the-range cooking appliance including: an enclosure including a cooking cavity configured to receive food, where the enclosure includes at least a rear-facing side and a top-facing side; a wall bracket configured to be secured to a wall disposed proximate to the wall cabinet and configured to support the enclosure proximate a bottom of the rear-facing side of the enclosure; and a cabinet bracket to support the enclosure from the underside of the wall cabinet, the cabinet bracket including first and second cooperating latch members, the first cooperating latch member mounted on the underside of the wall cabinet and the second cooperating latch member mounted on the top-facing side of the enclosure, where the first and second cooperating latch members are respectively configured to latch to one another when the enclosure is supported on the wall bracket proximate the bottom of the rear-facing side thereof and tilted upwardly to inhibit downward tilting of the enclosure after the first and second cooperating latch members are latched to one another.

In some embodiments, the wall bracket further includes a lip, and the enclosure is supported proximate the bottom of the rear-facing side of the enclosure by the lip of the wall bracket. In some embodiments, at least one of the first or second cooperating latch members includes a support bolt. In some such embodiments, this support bolt further includes an engageable head for tightening the support bolt after the first and second cooperating latch members are latched to one another. In other such embodiments, the support bolt is tightened through an opening in the wall cabinet. In still other embodiments, the support bolt is recessed into the top-facing side of the enclosure. In some embodiments, at least one of the first or second cooperating latch members includes a wedge. In other embodiments, at least one of the first or second cooperating latch members includes a cam. In some such embodiments, the cam further includes a spring-loaded arm configured to catch the support bolt and prevent forward movement of a shaft of the support bolt. In other such embodiments, the cam is installed at an angle on the wall cabinet and is configured to recess into the top-facing side of the enclosure. In still other such embodiments, the least one of the first or second cooperating latch members includes a cam and at least one of the first or second cooperating latch members includes a support bolt.

In some embodiments, the cabinet bracket is a first cabinet bracket and the over-the-range cooking appliance further includes a second cabinet bracket with a third and fourth cooperating latch member, the third cooperating latch member mounted on the underside of the wall cabinet and fourth cooperating latch member mounted on the top-facing side of the enclosure, where the third and fourth cooperating latch members are respectively configured to latch to one another when the enclosure is supported on the wall bracket proximate the bottom of the rear-facing side thereof and tilted upwardly to inhibit downward tilting of the enclosure after the third and fourth cooperating latch members are latched to one another. In some such embodiments, the first and third cooperating latch members are laterally separated on the underside of the wall cabinet and the second and fourth cooperating latch members are laterally separated on the top-facing side of the enclosure. In some embodiments, the over-the-range cooking appliance further includes a release mechanism on the cabinet bracket to disengage the first and second cooperating latch members for removal of cooking appliance. In other embodiments, the first cooperating latch member further includes an adjustment screw.

In another aspect, an over-the-range cooking appliance configured for mounting to an underside of a wall cabinet is disclosed, the over-the-range cooking appliance including: an enclosure with a cooking cavity configured to receive food, where the enclosure includes at least a rear-facing side and a top-facing side; a wall bracket to be secured to a wall disposed proximate to the wall cabinet and to support the enclosure proximate a bottom of the rear-facing side of the enclosure; and a second bracket to support the enclosure, the second bracket including first and second cooperating latch members, the first cooperating latch member mounted on the underside of the wall cabinet or on the wall and the second cooperating latch member mounted on the enclosure, where the first and second cooperating latch members are respectively configured to latch to one another when the enclosure is supported on the wall bracket proximate the bottom of the rear-facing side thereof and tilted upwardly to inhibit downward tilting of the enclosure after the first and second cooperating latch members are latched to one another.

In some embodiments, the first cooperating latch member is a U-shape support bolt or a C-shape support bolt. In some embodiments, the second cooperating latch member further includes: a cam movable between a first position and a second position relative to the first cooperating latch member; and a biasing member for biasing the cam in the second position. In some embodiments, the second cooperating latch member is disposed on the rear-facing side of the enclosure. In other embodiments, the second cooperating latch member and wall bracket are included on a singular bracket secured to the wall. In still other embodiments, the second cooperating latch member is disposed on the top-facing side of the enclosure.

In yet another aspect a kit for installing an over-the-range cooking appliance to an underside of a wall cabinet is disclosed, the over-the-range cooking appliance including an enclosure with a cooking cavity configured to receive food, where the enclosure includes at least a rear-facing side and a top-facing side, the kit comprising: a wall bracket configured to be secured to a wall disposed proximate to the wall cabinet and configured to support the enclosure proximate a bottom of the rear-facing side of the enclosure; and a cabinet bracket configured to support the enclosure from the underside of the wall cabinet; where a first cooperating latch member of the cabinet bracket is mounted on the underside of the wall cabinet and is configured to engage a second cooperating latching member secured to the cooking appliance when the enclosure is supported on the wall bracket proximate the bottom of the rear-facing side thereof and tilted upwardly to inhibit downward tilting of the enclosure after the first and second cooperating latch members are latched to one another.

In some embodiments, the kit for installing an over-the-range cooking appliance additionally includes a template to allow a user to determine a location for holes to be drilled for installation of the wall bracket on the wall or cabinet bracket on the wall cabinet. In some embodiments, the wall bracket additionally a lip and the enclosure is supported proximate the bottom of the rear-facing side of the enclosure by the lip of the wall bracket. In some embodiments, the at least one of the first or second cooperating latch members is a support bolt. In some such embodiments, the support bolt additionally includes an engageable head for tightening the support bolt.

In some embodiments, at least one of the first or second cooperating latch members is a wedge. In other embodiments, at least one of the first or second cooperating latch members is a cam. In still other embodiments, at least one of the first or second cooperating latch members is a cam and at least one of the first or second cooperating latch members is a support bolt.

In still yet another aspect, a method for installing an over-the-range cooking appliance to an underside of a wall cabinet is disclosed, the over-the-range cooking appliance including an enclosure with a cooking cavity configured to receive food, where the enclosure includes at least a rear-facing side and a top-facing side, the method including: installing a wall bracket, where the wall bracket is configured to support the enclosure proximate a bottom of the rear-facing side of the enclosure; installing, on the underside of the wall cabinet, a cabinet bracket configured to support the enclosure from the underside of the wall cabinet, where the cabinet bracket includes first and second cooperating latch members, the first cooperating latch member mounted on the underside of the wall cabinet and the second cooperating latch member mounted on the top-facing side of the enclosure, placing the over-the-range cooking appliance onto the wall bracket such that the rear-facing side of the enclosure is supported by the wall bracket and while a front-facing side of the enclosure is at a lower elevation than the rear-facing side; and pivoting the over-the-range cooking appliance upwardly until the first and second cooperating latch members latch to one another to lock the over-the-range cooking appliance and thereby support the enclosure from the cabinet bracket.

In some embodiments, the method for installing an over-the-range cooking appliance additionally includes determining, through a template, a first location for drilling holes for the cabinet bracket and a second location for drilling holes for the wall bracket. In some embodiments, the wall bracket additionally includes a lip, and placing the over-the-range cooking appliance onto the wall bracket at an angle additionally includes supporting the enclosure proximate the bottom of the rear-facing side of the enclosure by the lip of the wall bracket.

In other embodiments, at least one of the first or second cooperating latch members is a support bolt. In some such embodiments, the support bolt includes an engageable head and the method for installing the over-the-range cooking appliance further includes tightening, through engaging the engageable head, the support bolt. In some embodiments, at least one of the first or second cooperating latch members is a cam lock.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described example embodiments of the invention. This summary is merely provided to introduce a selection of concepts that are further described below in the detailed description, and is not intended to identify key or essential features of the claimed subject matter, nor is it intended to be used as an aid in limiting the scope of the claimed subject matter.

BRIEF DESCRIPTION OF THE DRAWINGS

FIG. 7A is a "U" shaped support bolt; FIG. 7B is a "C" shaped support bolt.

FIG. 8A is a side view of the bracket, where one of the cooperating latch members is mounted on a rear-facing side of the enclosure;

FIG. 8B is a side view of the bracket, where one of the cooperating latch members is mounted on a rear-facing side of the enclosure.

FIG. 9A is a perspective view of the bracket;

FIG. 9B is a perspective view of the bracket mounted on the underside of a cabinet and the corresponding cooperating latch member mounted on a top-facing side of an enclosure of a microwave.

FIG. 11A is a perspective view of the bracket;

FIG. 11B is a perspective view of the bracket mounted on the underside of a cabinet and the corresponding cooperating latch member mounted on the top-facing side of an enclosure.

FIG. 12A is a front perspective view of the bracket, including a first and second cooperating latch member; FIG. 12B is a side perspective view of the first cooperating latch member; FIG. 12C is a perspective view of the bracket mounted on the underside of a cabinet and the corresponding cooperating latch member mounted on the top-facing side of an enclosure.

DETAILED DESCRIPTION

The embodiments discussed hereinafter are directed in part to an over-the-range cooking appliance, mounting kit, and method therefor that utilize a cabinet bracket that is mounted on the underside of a cabinet and that incorporates one or more sets of a latching elements in combination with a wall bracket to facilitate mounting of the cooking appliance. The cabinet and wall brackets, in particular, may implement a unique "rock and lock" approach in which a front of an enclosure of the cooking appliance may be tilted upwardly while the rear of the enclosure is supported by the wall bracket to engage with the cabinet bracket to effectively lock the enclosure to the cabinet bracket using the one or more sets of latching elements. The illustrated embodiments hereinafter focus on a microwave cooking appliance, but it will be appreciated that the herein-described techniques may be used to mount other types of over-the-range cooking appliances, so the invention is not limited to use with microwave cooking appliances.

Figure 1:
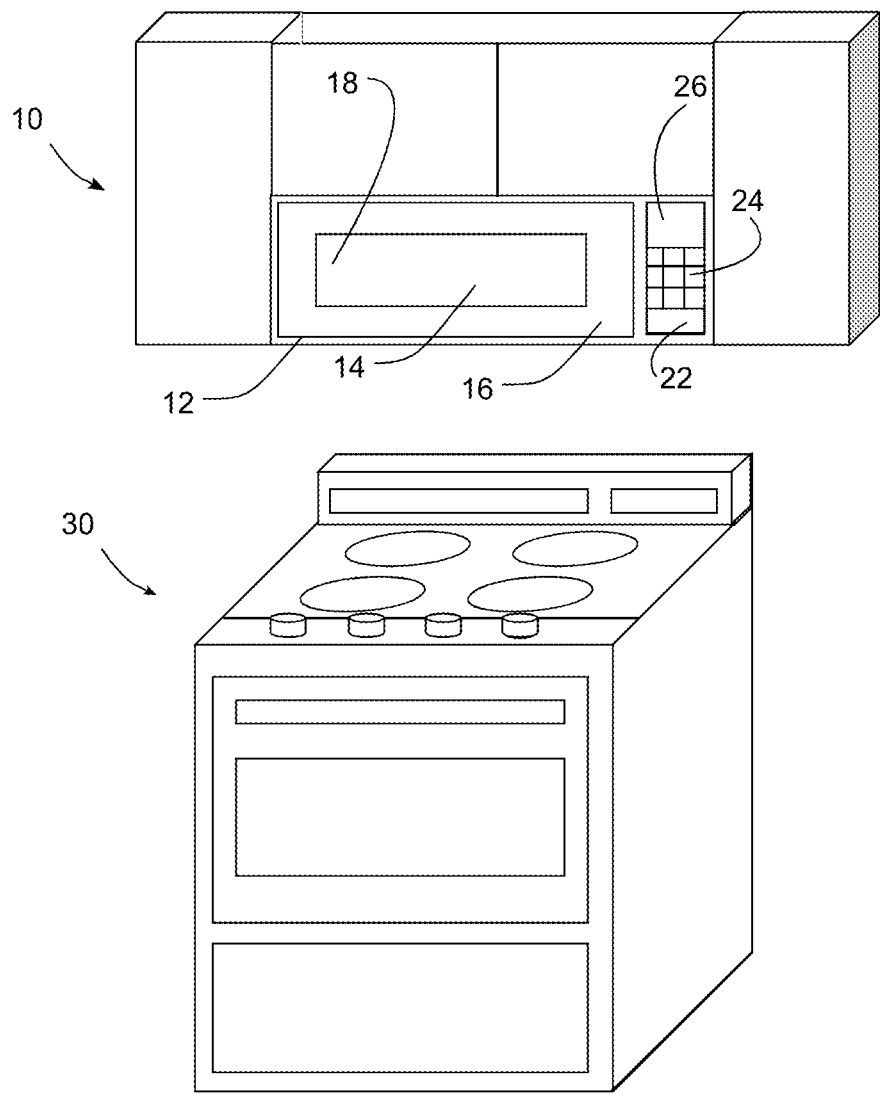
FIG. 1 is a perspective view of an over-the-range microwave cooking appliance consistent with some embodiments of the invention.

Turning now to the drawings, wherein like numbers denote like parts throughout the several views, FIG. 1 illustrates an example over-the-range microwave cooking appliance 10 in which the various technologies and techniques described herein may be implemented. The microwave cooking appliance 10 illustrated in FIG. 1 is an over-the-range microwave installed over the stove 30. Over-the-range microwaves offer several advantages over a countertop microwave, including that they do not take up valuable counter space and may provide a neater appearance to the kitchen. Additionally, over-the-range microwave cooking appliances may have built in exhaust fans that serve as a stovetop ventilation system to minimize smoke, steam, and cooking odors.

The over-the-range microwave cooking appliance 10 is a residential-type microwave cooking appliance, and as such includes a housing or enclosure 12, which further includes a cooking cavity 14, as well as a door 16 disposed adjacent the respective opening of the cooking cavity 14. In some embodiments, the door 16 may further include a window 18 that allows a user to view the items inside the cooking cavity 14. In some embodiments, in place of, or in addition, to the handle (not illustrated), the over-the-range microwave cooking appliance 10 may include a button 22 that a user may press to trigger the opening of the door 16.

The over-the-range microwave cooking appliance 10 may also include one or more user activated controls 24, which may be in the form of buttons, knobs, a touchscreen, or the like. In some embodiments, these user activated controls 24 may be used to program a cooking time and/or a cooking power level. In addition, in some embodiments, these user activated controls 24 may be used to selected one or more preset conditions for a particular food item to be cooked or a particular desired action (e.g. "popcorn", "defrost", "frozen pizza", etc.). In some embodiments, the preset conditions may include one or more adaptive thermal sensing cycles such as an auto-defrost or auto-cook cycle, which are described in greater detailed herein. The over-the-range microwave cooking appliance 10 may also include a display 26, which may be used to convey a variety of information to a user. For example, in some embodiments, the display 26 may be used to display the time when the over-the-range microwave cooking appliance 10 is not in use. In other embodiments, the display 26 may be used to display cooking times, power levels and/or temperatures.

Over-the-Range Microwave for Mounting

As described previously, over-the-range microwave cooking appliances typically require multiple people to install. A first person may be required to hold the microwave in place, for example on a wall bracket, while a second person may insert the mounting screws downwardly through a bottom of the upper wall cabinet and thread them into the over-the-range microwave cooking appliance. There continues to be a need for a manner of mounting such a cooking appliance and hardware for the same that would allow a single person to install an over-the-range microwave, or if multiple people participated in the installation, to substantially simplify the installation process.

An over-the-range microwave cooking appliance that may be installed more easily, and in many instances by a single person, is described herein. Such a cooking appliance may include an enclosure with a cooking cavity for food; the enclosure having at least a rear-facing side and a top-facing side. The microwave also includes a wall bracket secured to the wall that may support the enclosure near the bottom of the rear-facing side and a cabinet bracket to support the enclosure from the underside of a wall cabinet. The cabinet bracket may have a first and second cooperating latch member, where the first cooperating latch member may be mounted on the underside of the wall cabinet and the second cooperating latch member may be mounted on the top-facing side of the enclosure. These cooperating latch members may latch to one another when the enclosure is supported on the wall bracket and then pivoted or tilted upwardly. In many instances, a single person may be able to place the over-the-range microwave oven onto the wall bracket at an angle and then rotate or pivot the front of the cooking appliance upwardly in order for the cooperating latching members to latch.

Figure 2:
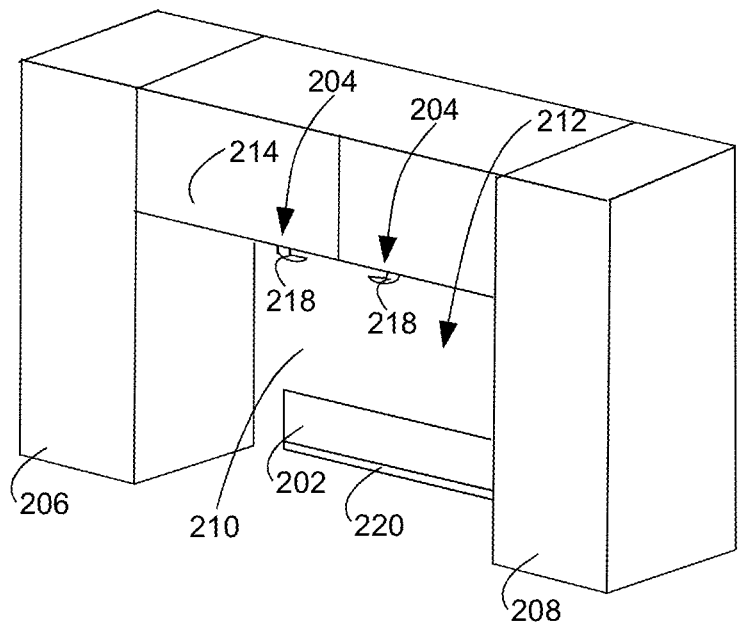
FIG. 2 is a top perspective view of a wall bracket and cabinet bracket consistent with some embodiment of the invention.
Figure 3:
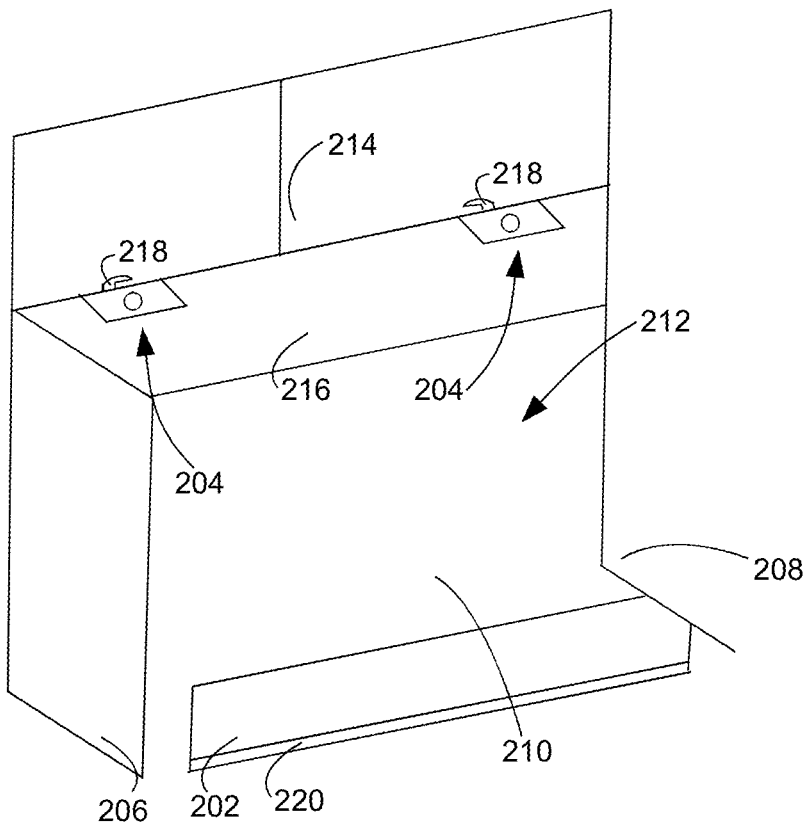
FIG. 3 is a partial bottom perspective view of the wall bracket and cabinet bracket of FIG. 2.
Figure 4:
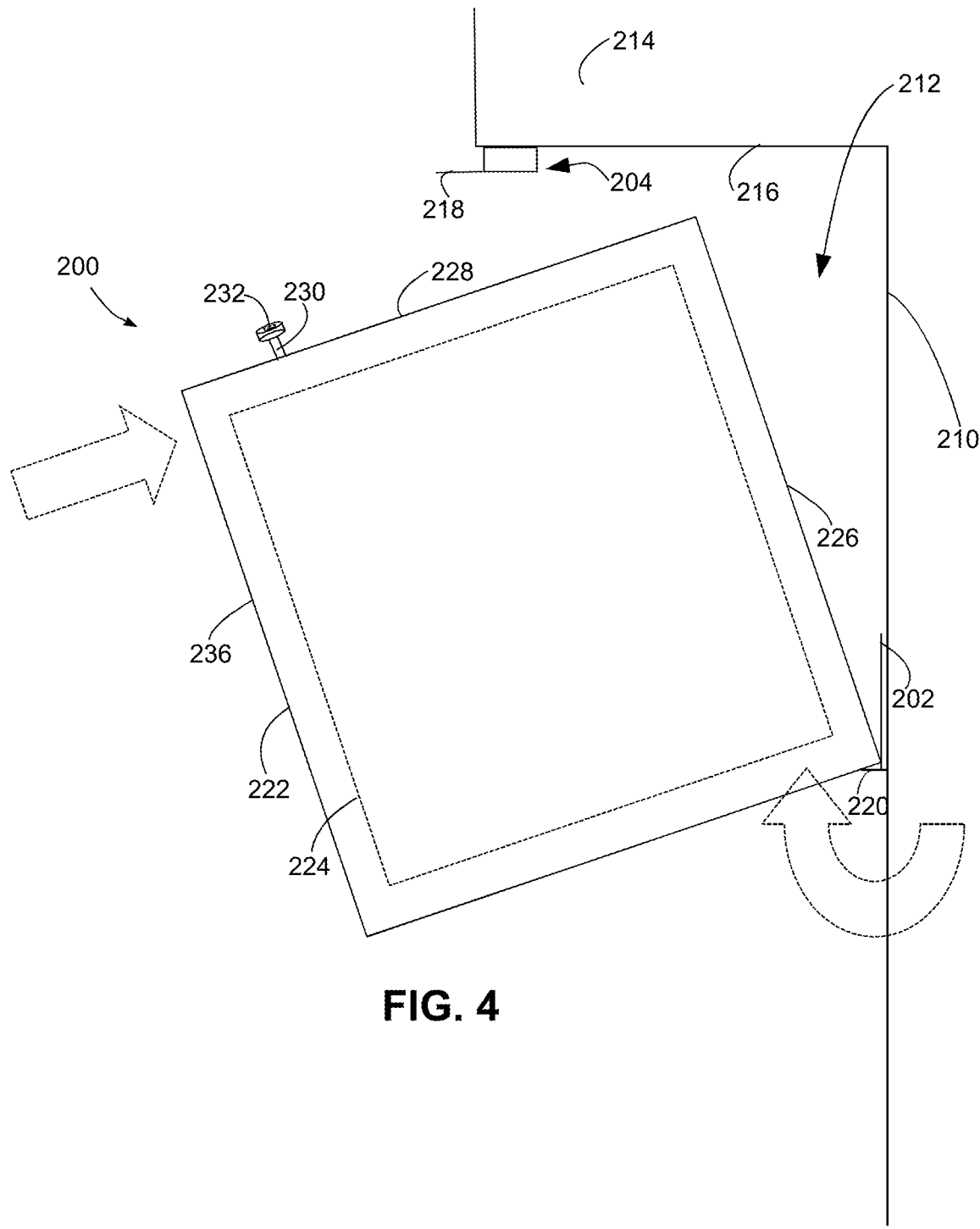
FIG. 4 is a side view of in an installation of an over-the-range microwave cooking appliance consistent with some embodiments herein.

Referring now to FIGS. 2 and 3, these figures illustrate a top and bottom perspective view, respectively, of an exemplary wall bracket 202 and exemplary cabinet bracket that may be utilized to install an over-the-range microwave cooking appliance (not illustrated in FIGS. 2 and 3, see 200 in FIG. 4). FIGS. 2 and 3 illustrate a typical cabinet layout or design, with a first wall cabinet 206 and a second wall cabinet 208 installed on a wall 210 with an opening 212 disposed between them to receive an over-the-range microwave. Also, between the first and second wall cabinets 206, 208 is a third wall cabinet 214 located above the opening 212 for the over-the-range microwave. The term wall cabinet refers to a cabinet typically disposed over a countertop or any cabinet not a base-type cabinet that typically supports a counter. Furthermore, the term wall may refer to any substantially vertical support structure, and that may be intermediate structures to which the wall bracket is directly attached. The underside 216 of this third wall cabinet 214 is located proximate a top-facing side of the over-the-range microwave when the microwave is installed. In some instances, the third wall cabinet 214 located above the opening 212 may contain a functional cabinetry for storage; while in other instances, such as illustrated in FIGS. 2 and 3, the third wall-mounted cabinet 214 may be decorative or consist of just cabinet framing. The cabinet layout design illustrated in FIGS. 2 and 3 is not to be understood as limiting, and may vary based on the specifics of any particular kitchen layout. For example, in some instances, the over-the-range microwave may be flanked on one side by a wall (e.g. where the microwave is located in a corner) and on a second side by a cabinet, or one side may be open.

Also secured to the wall 210 is the wall bracket 202. The wall bracket 202 may, in some instances, be constructed of a stamped metal, including stainless steel or any other suitable metal. The wall bracket 202 is configured to support the rear portion of an over-the-range microwave cooking appliance, and as will become more apparent below, this bracket may be used during installation to initially support the rear portion of the appliance during installation, and may do so when the appliance is tilted forward at an angle with a front portion of the appliance at a lower elevation than the rear portion (see FIG. 4). In some instances, the wall bracket 202 may additionally include a lip 220 or a protrusion that extends away from the wall 210 upon which a bottom portion of the over-the-range microwave cooking appliance may rest. Although illustrated as a single-piece wall bracket 202, this is not intended to be limiting. In some embodiments, the wall bracket 202 may be two or more separate wall bracket pieces, each attached to the wall 210, for example at a predefined distance from each other, to support the over-the-range microwave cooking appliance. In other embodiments, the wall bracket 202 may engage the microwave cooking appliance elsewhere proximate to the bottom of the microwave. For example, this engagement may occur on the bottom-facing side or rear-facing side, but separated from the corner formed between the two. In some instances, the wall bracket 202, microwave cooking appliance, or both may further include fingers or slots to support the microwave cooking appliance. Any support arrangement that allows for support for the rear of the microwave cooking appliance while also allowing some pivoting to the level installation position could be used. Additionally, the wall bracket 202 and/or the microwave cooking appliance may include structures to laterally align the microwave cooking appliance on the wall bracket 202 to prevent lateral movement.

The cabinet bracket may include a first cooperating latch member 204 and a second cooperating latch member (not visible in FIGS. 2 and 3, see 230 in FIG. 4). The first cooperating latch member 204, as illustrated in FIGS. 2 and 3 may be mounted on the underside of the third wall cabinet 214 located over the opening 212 for the over-the-range microwave. In some instances, the first cooperating latch member 204 of the cabinet bracket may include a cam lock 218 that may be attached to the underside of the third wall cabinet 214. Similar to the wall bracket 202, the cam lock 218 may, in some instances, be constructed of a stamped metal, including stainless steel or any other suitable metal. The cam lock 218 may be attached to the underside of the third wall cabinet 214 through bolts, screws, welding to a metal plate (that is attached to the underside of the third wall cabinet 214), or any other attachment mechanism known. In other instances, the first cooperating latch member 204 may be a wedge lock or any other type coupling/locking mechanisms. The first cooperating latch member 204 and a second cooperating latch member (see 230 in FIG. 4) may latch to each other when the microwave cooking appliance is supported on the wall bracket 202 and tilted upwardly.

In instances where the first cooperating member 204 is a cam lock 218 the cam may function as a catch to engage the second cooperating latch member (see 230 in FIG. 4). In some instances, the cam 218 may be biased by a spring or otherwise bent to a closed position that prevents forward movement of the bolt shaft. For example, when an installer pushes the microwave cooking appliance towards the third wall cabinet 214 (see FIGS. 4 and 5) the second cooperative latch member 230 (for example a support bolt) may move laterally. This movement may allow the second cooperative latch member 230 to pass through the cam 218. After second cooperative latch member 230 has engaged the cam 218, the cam 218 may snap back, for example through a spring, to prevent forward movement of the second cooperative latch member 230.

Figure 5:
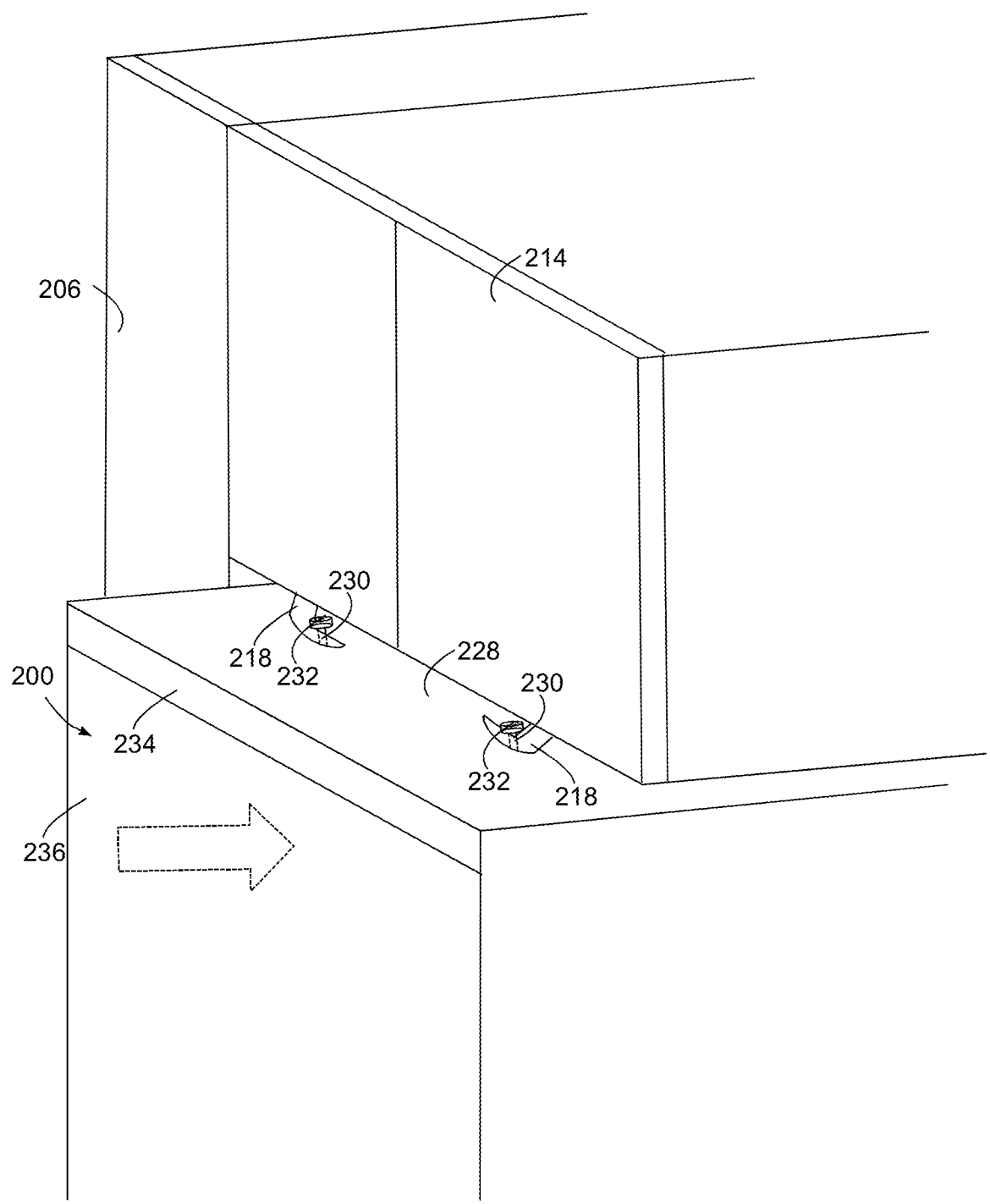
FIG. 5 is a perspective view of in an installation of an over-the-range microwave cooking appliance consistent with some embodiments herein.

Turning now to FIG. 4 a side view of the over-the-range microwave oven 200 is illustrated mid-installation. The second wall cabinet 208 installed on a wall 210 is not visible in FIG. 4, so that the over-the-range microwave oven 200 is more easily visible. The over-the-range microwave cooking appliance 200 includes an enclosure 222 or a housing that contains a cooking cavity 224 that can receive food to be cooked and/or other items to be heated. The over-the-range microwave 200 may also include a rear-facing side 226 and a top-facing side 228. The top-facing side 228 may additionally include the second cooperating latch member 230. In some instances, the second cooperating latch member 230 may be mounted on the top-facing side 228 of the enclosure 222 so that the second cooperating latch member 230 protrudes from the enclosure 222, as illustrated in FIGS. 4 and 5; while in other instances, the second cooperating latch member 230 may be mounted on the top-facing side 228 of the enclosure 222 so that the second cooperating latch member 230 may be recessed into the enclosure 222. However, the arrangement of the first and second cooperating latch members 204, 230 is not to be understood as limiting. In some instances, the first cooperating latch member 204 herein, or the cam 218 may be disposed on the enclosure 222, while the second cooperating latch member 230, or support bolt, may be on the wall 210, for example see FIG. 6.

The first and second cooperating latch members 204, 230 may latch to one another when the enclosure is supported on the wall bracket 202 near the bottom of the rear-facing side 226 and tilted upwardly. In some instances, such as illustrated in FIGS. 4 and 5, the second cooperating latch member 230 may be a support bolt. This support bolt may latch to the first cooperating latch member 204, for example in the form of a cam lock as illustrated, when the enclosure 222 is supported on the wall bracket 202 and is tilted or pivoted upwardly (as showing in broken line in FIG. 4). This latching may inhibit downward and/or forward tilting of the enclosure 222 after the first and second cooperating latch members 204, 230 are latched to one another. This may remove the need for an installer to hold the over-the-range microwave oven 200 in place and allows the installer to focus on the remaining installation steps. In some instances, the latching of the first and second cooperating latch members 204, 230 may produce an audible indication of latching for the installer; for example, there may be an audible "click" when the first and second cooperating latch members 204, 230 are latched to one another. Such an audible indication may signify the weight of over-the-range microwave 200 is being held by the wall bracket 202 and cabinet bracket 204, 230. In some instances, as described below, the over-the-range microwave 200 may remain loosely held by the wall bracket 202 and cabinet bracket 204, 230 and the connection may be tightened to fully secure the over-the-range microwave 200 into a final installation position.

In some instances, in particular where the second cooperating latch member 230 is a support bolt, the support bolt may further include an engageable head 232 that may be used to tighten the connection between the over-the-range microwave oven 200 and the third wall cabinet 214. In some instances, the engageable head 232 may be a hex head, phillips head, flat head, or any other shape of head known in the art. In such instances, the support bolt with the engageable head 232 may be tightened through a hole drilled in the appropriate location of the third wall cabinet 214. While, in such instances, a hole may be drilled through the third wall cabinet 214 for access to the head, there would be no need to insert bolts from the top down and try to align the bolts with apertures in the top of the appliance. Such an arrangement may only require that the engageable head 232 to be tightened from above. In still other embodiments, however, securement of the appliance to the cabinet may incorporate additional fasteners such as screws or bolts that are driven from the top down, but while the appliance is being held in place by the cooperating latch members so that the installer is not required to simultaneously hold the appliance in place while attempting to drive fasteners into the top of the appliance.

Figure 7A:
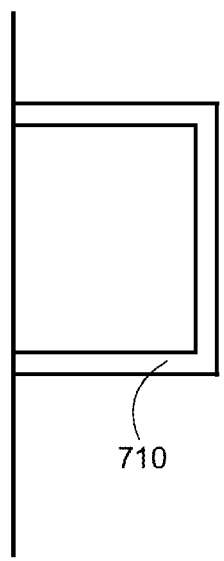
FIGS. 7A-B illustrate exemplary support bolts consistent with some embodiments herein.
Figure 7B:
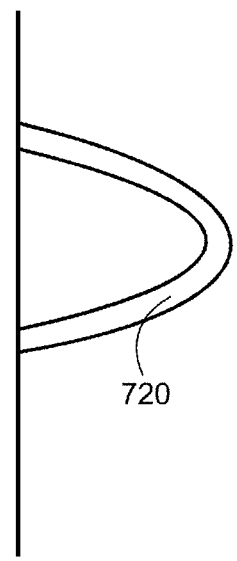

Although illustrated and described as a support bolt, the second cooperating latch member 230 is not so limited. The second cooperating latch member may also be a "U" shape bolt 710 or a "C" shape bolt 720 that may engage with the first cooperating latching member, for example as illustrated is FIGS. 7A and B, respectively. Furthermore, although the first and second cooperating latch members 204, 230 are illustrated and described as being a cam lock and a support bolt respectively, this is not to be understood as limiting. In some instances, the first cooperating latch member 204 mounted on the underside of the third wall cabinet 214 may be a support bolt of a variety of shapes discussed herein, while the second cooperating latch member 230 on top-facing side 228 of the enclosure 222 may be a cam lock, wedge, or the like. Some additional examples of other embodiments of the latching members are described with respect to FIGS. 8A-B, 9A-B, 10, 11A-B, and 12A-C.

In other instances, the first and second cooperating latch members 204, 230 may be designed so as to maximize the aesthetic appearance of the over-the-range microwave 200. In some such instances, the first cooperating latch member 204 may be installed at an angle on the third wall cabinet 214, which may allow the first cooperating latch member (e.g. a cam lock) to recess into the top-facing side 228 of the enclosure 222. The second cooperating latch member 230 (e.g. a support bolt) may be installed on a slide so that once the first and second cooperating members 204, 230 latch, the installer may be able to pull the over-the-range microwave oven 200 to the third wall cabinet 214 from an access panel 234 on a front-facing side 236 of the over-the-range microwave oven 200.

Although FIGS. 2-5 illustrate having two of each of the first and second cooperating latch members 204, 230, this is not to be understood as limiting. In some instances, only one of each of the first and second cooperating latch members 204, 230 may be used, where only one of each of the first and second cooperating latch members 204, 230 is sufficient to support the weight of the over-the-range microwave 200. In other instances, three or more of each the first and second cooperating latch members 204, 230 may be used to distribute the weight of the over-the-range microwave 200.

In some instances, it may be desirable to release the first and second cooperating latch members 204, 230 so that the microwave cooking appliance 200 may be more easily disconnected to the cabinet. In other instances, for example where there are two of each of the first and second cooperating latch members 204, 230 (as illustrated in FIGS. 2-5), a single cable may be attached to each release mechanism in order to provide a singular release mechanism to simultaneously release both all cooperative latch members. A user may be be able to pull this single cable to acitive all release mechanisms simultaneously.

A method of installing an over-the-range cooking appliance, for example microwave 200 described with reference to FIGS. 2-5, is also described herein. Such a method may, optionally, include determining a first location for drilling holes for the cabinet bracket and a second location for drilling holes for the wall bracket. Such locations may be determined through the use of a template. This template may, for example, be a piece of paper, cardboard, or the like that includes markings for the holes and distance between the holes for easier installation. After the location of the a first and second location for drilling holes for the cabinet and wall brackets, respectively, the cabinet and wall brackets may be installed on the underside of a wall mounted cabinet (e.g. the third wall cabinet 214 in FIGS. 2-5) and wall, respectively.

The over the range cooking appliance may be placed onto the wall bracket at an angle, for example see FIG. 4, and generally with the front of the appliance at a lower elevation than the rear of the appliance. In some instances, the over-the-range cooking appliance may further include one or more locating features on the rear-facing side that may assist an installer in aligning the appliance with the wall bracket. In some instances, these locating features may including, but not be limited to, a recessed position, one or more raised areas (e.g. bumps), or anything else that could facilitate an installer, in particular by feel alone, in aligning the rear-facing side of the microwave with the wall bracket. Once on the wall bracket, the over-the-range cooking appliance may be pivoted upward until the first and second cooperating latch members latch to each other. In some instances, once the first and second cooperating latch members have latched to each other the over-the-range cooking appliance may be in a final installation position. In other instances, the installer may need to take further action to complete the installation. For example, the installer may need to tighten the connection between the over-the-range cooking appliance and the third wall cabinet located above the appliance. This tightening may, in some instances, be achieved through the use of an engageable head.

Figure 6:
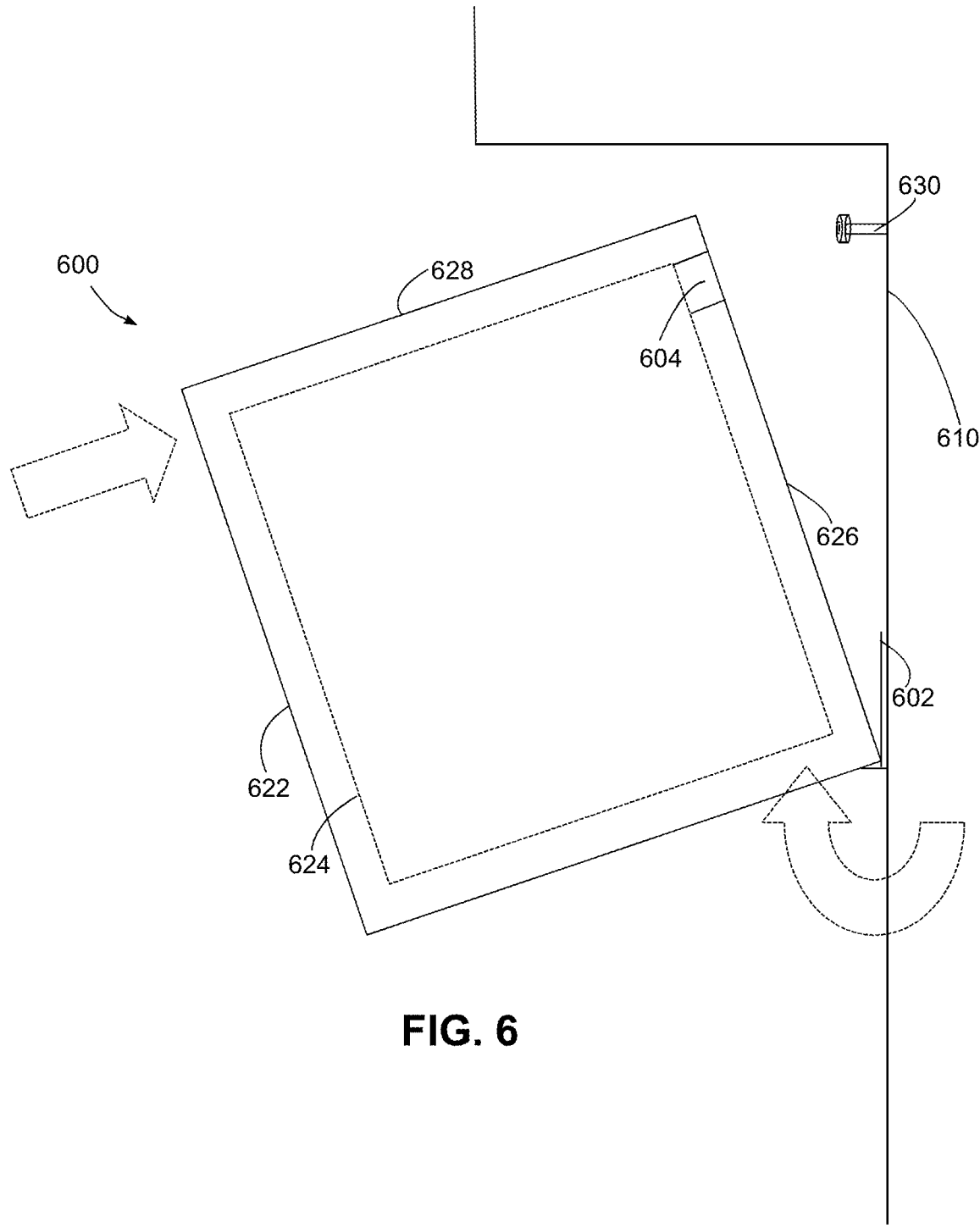
FIG. 6 is a side view of an installation of an over-the-range microwave cooking appliance consistent with some embodiments herein.

Turning now to FIG. 6, a side view of another embodiment of an over-the-range microwave oven 600 is illustrated mid-installation. Similar to the embodiment described with reference to FIGS. 2-5, the over-the-range microwave cooking appliance 600 includes an enclosure 622 or a housing that contains a cooking cavity 624 that can receive food to be cooked and/or other items to be heated. The over-the-range microwave 600 may also include a rear-facing side 626 and a top-facing side 628. In contrast to the embodiment illustrated in FIGS. 2-5, the first cooperating latch member 604 may be mounted on the rear-facing side 626 of the enclosure, and may engage a second cooperating latch member 630 that is mounted on the wall 610. In some instances, the first cooperating latch member 604 of the cabinet bracket may include a cam lock. In some instances, the first cooperating latch member 604 may be recessed into the enclosure 622, as illustrated.

In some instances, the second cooperating latch member 630, which is mounted on the wall 610, may be a part of a large singular bracket secured to the wall. This large, singular bracket may include the second cooperating latch member 630 and the wall bracket 602.

Figure 8A:
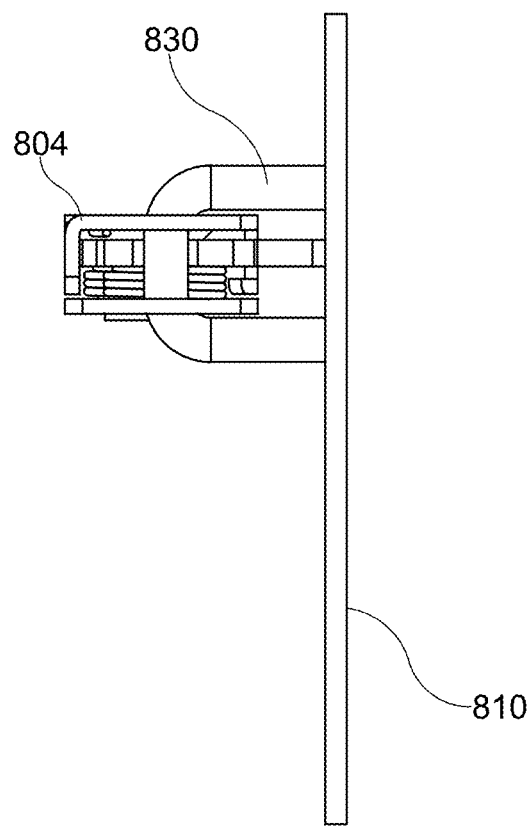
FIGS. 8A-B illustrate exemplary brackets consistent with some embodiment of the invention.
Figure 8B:
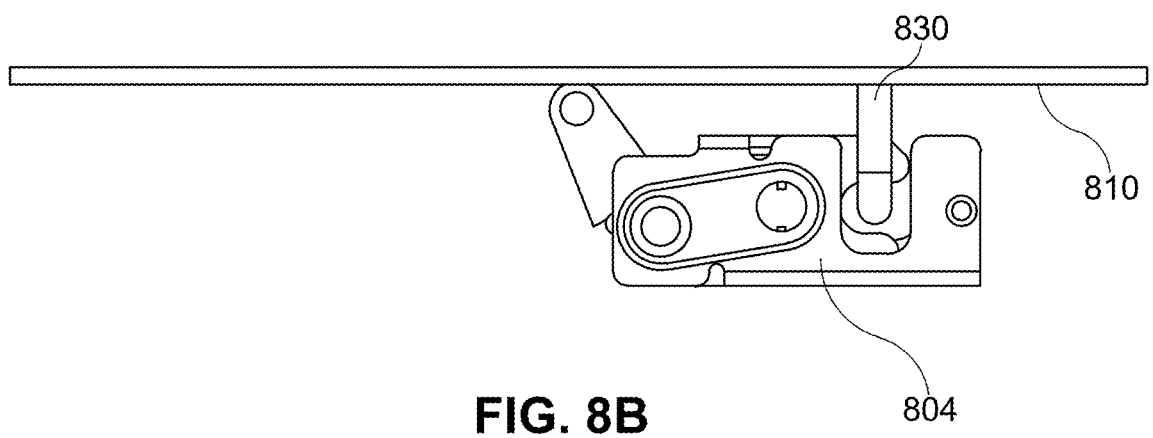

In some instances, the first cooperating latch member 204, 604 may be a hook with a spring that deflects during engagement and snaps back into place in order to hold the unit up, such as illustrated in FIGS. 2-5. In other instances, the first cooperating latch member 204, 604 may be movable between a first and a second position, relative to the second cooperating latch member. In such instances, such as illustrated in FIGS. 8A-B, the movable first cooperating latch member 804 may have multiple parts and a spring or other bias member to engage with the unit. In some instances, the movable first cooperating member 804 may be movable between a first position (e.g. ready to engage the second cooperative latch member) to second position (e.g. engaged with the second cooperative latch member) through rotation. In other instances, the movable first cooperating member 804 may slidably move between a first position (e.g. ready to engage the second cooperative latch member) to second position (e.g. engaged with the second cooperative latch member).

FIGS. 8A-B each illustrate an embodiment the first cooperating latch member 804 that has engaged a second cooperative latch member 830 that is mounted on the wall 810. In FIG. 8A the first cooperating latch member 804 is mounted to the rear-facing side of an enclosure of a microwave (not illustrated); while in FIG. 8B the first cooperating latch member 804 is mounted to the top-facing side of an enclosure of a microwave (not illustrated).

Figure 9A:
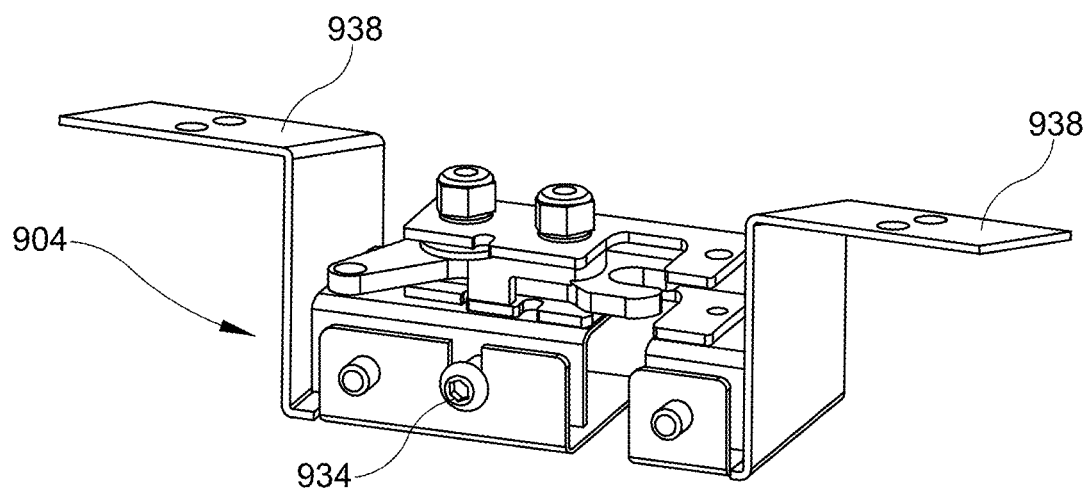
FIGS. 9A-B illustrate an exemplary bracket consistent with some embodiments of the invention.
Figure 9B:
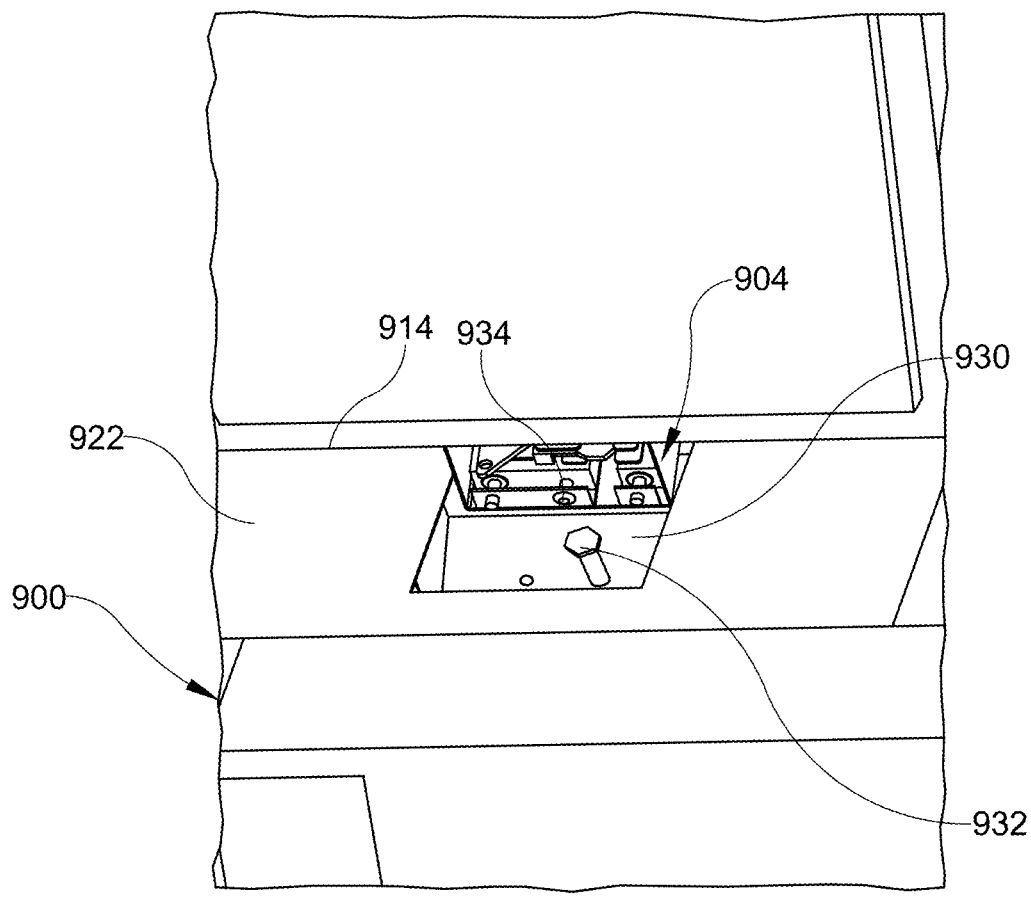

FIGS. 9A-B illustrate another embodiment of a first cooperating latch member 904 and a second cooperating latch member 930 (only illustrated in FIG. 9B). The second cooperating latch member 930, which may contain a bolt 932, may be installed within the enclosure 922 of the microwave 900. In some instances, such as illustrated in FIG. 9B, the second cooperating latch member 930 may be recessed within a top-facing surface of the microwave 900. The first cooperating latch member 904 may be installed, for example via a connection surface 938, on the underside of a wall cabinet 914. Once the first and second cooperating latch members 904, 930 latch together, one or more adjustment screws 934 may be used to raise the microwave 900 towards the underside of a wall cabinet 914. In some instances, the angle of a connection surface 938 of the first cooperating latch member 904 may be tangent to the pivot arc of the microwave 900. The angle of the connection surface 938 may be, for example, between about 15 degrees and about 40 degrees. In the embodiment illustrated in FIGS. 9A-B, this angle is about 15 degrees.

Figure 10:
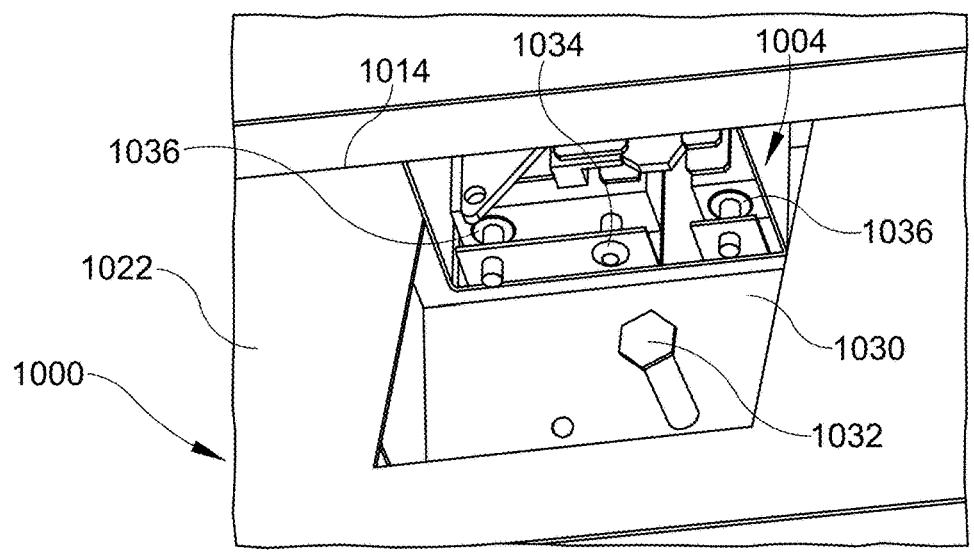
FIG. 10 is a perspective view of another exemplary bracket mounted on the underside of a cabinet and the corresponding cooperating latch member mounted on the top-facing side of an enclosure of a microwave consistent with some embodiments of the invention.

FIG. 10 illustrates another embodiment a first cooperating latch member 1004 and a second cooperating latch member 1030 that is similar to the embodiment illustrated in FIGS. 9A-B. Similarly to the embodiment in FIGS. 9A-B, the second cooperating latch member 1030 may contain a bolt 1032 and be installed recessed within the enclosure 1022 of the microwave 1000. The first cooperating latch member 1004 may be installed underside of a wall cabinet 1014. The first cooperating latch member may also include one or more nylon bushings 1036. These nylon bushings 1036 may be used to reduce the friction between the components of the first cooperating latch member 1004 and facilitate movement during the adjustment process. Additionally, the nylon bushings 1036 may minimize the need for external lubrication, and they may distribute load. As mentioned previously, the angle of a connection surface (not visible in FIG. 10) of the first cooperating latch member 1004 may be tangent to the pivot arc of the microwave 1000, which in the embodiment illustrated in FIG. 10A-B may be about 32 degrees; however, this is not intended to be limiting. Once latched, one or more adjustment screws 1034 on the first cooperating latch member 1004 may be used to raise the microwave 1000 towards the underside of a wall cabinet 1014.

Figure 11A:
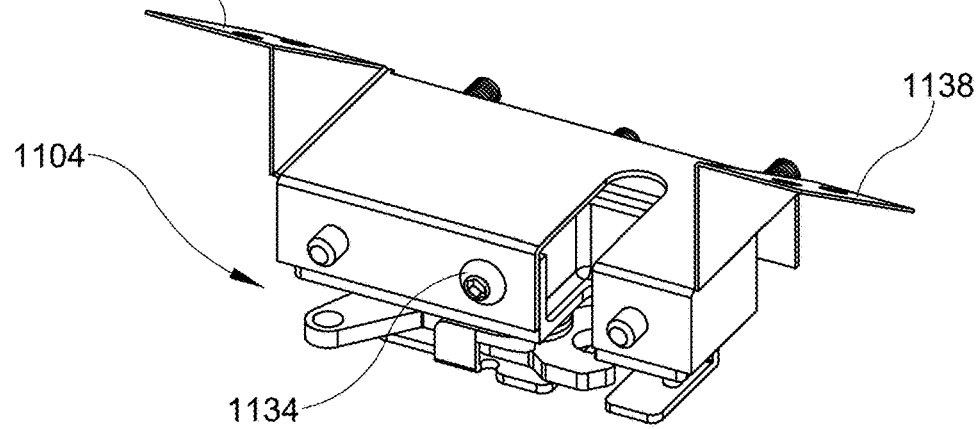
FIGS. 11A-B illustrate yet another exemplary bracket consistent with some embodiments of the invention.
Figure 11B:
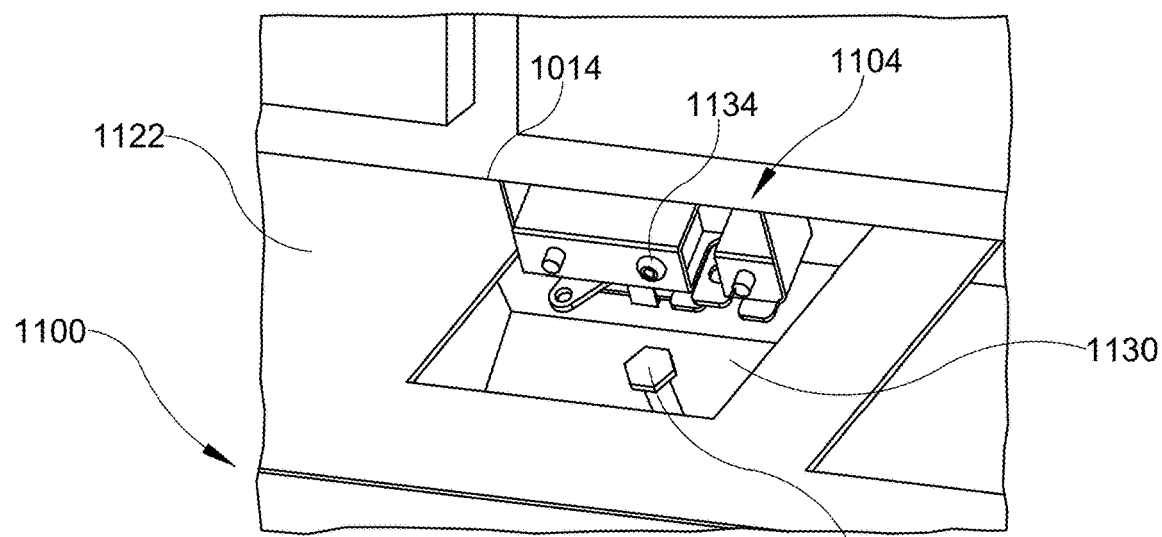

FIGS. 11A-B illustrate yet another embodiment of a first cooperating latch member 1104 and a second cooperating latch member 1130 (only in FIG. 11B). The embodiment illustrated in FIGS. 11A-B is similar to that illustrated in FIG. 10, for example the second cooperating latch member 1130 may contain a bolt 1132 that may be installed recessed within the enclosure 1122 of the microwave 1100. Similar to other embodiments, the first cooperating latch member 1104 may be installed underside of a wall cabinet 1114 through the connection surface 1138. As described previously, the connection surface 1138 may be tangent to the pivot arc of the microwave 1100, which in the embodiment illustrated in FIG. 11 may be about 32 degrees. The structure of the first cooperating latch member 1104 is different from that of the previous embodiments, such that the one or more adjustment screws 1134 on the first cooperating latch member 1104 may be closer to the underside of a wall cabinet 1114. This may allow for easier access by an installer to the one or more adjustment screws.

Figure 12A:
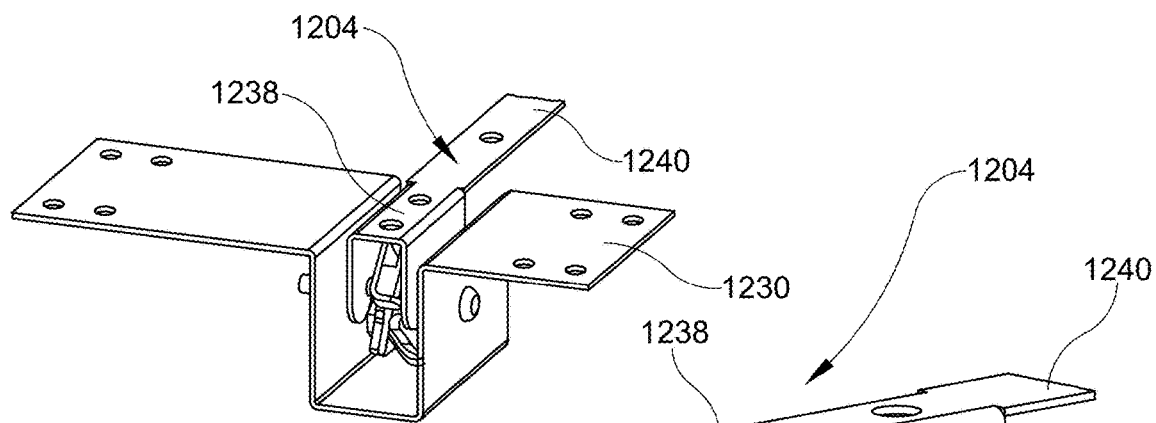
FIGS. 12A-C illustrate still yet another exemplary bracket consistent with some embodiments of the invention.
Figure 12B:
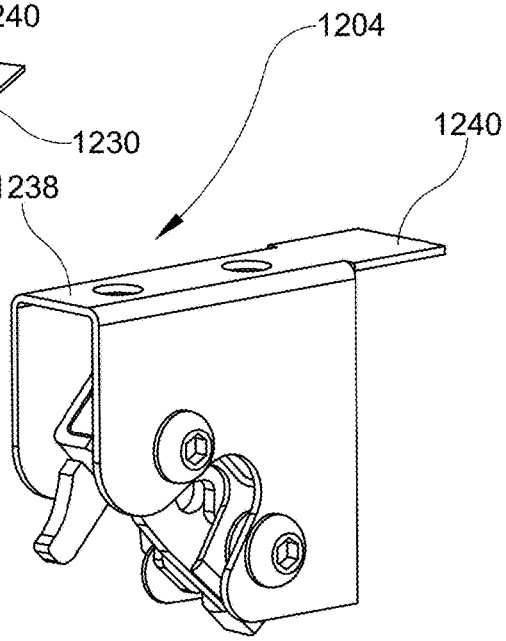
Figure 12C:
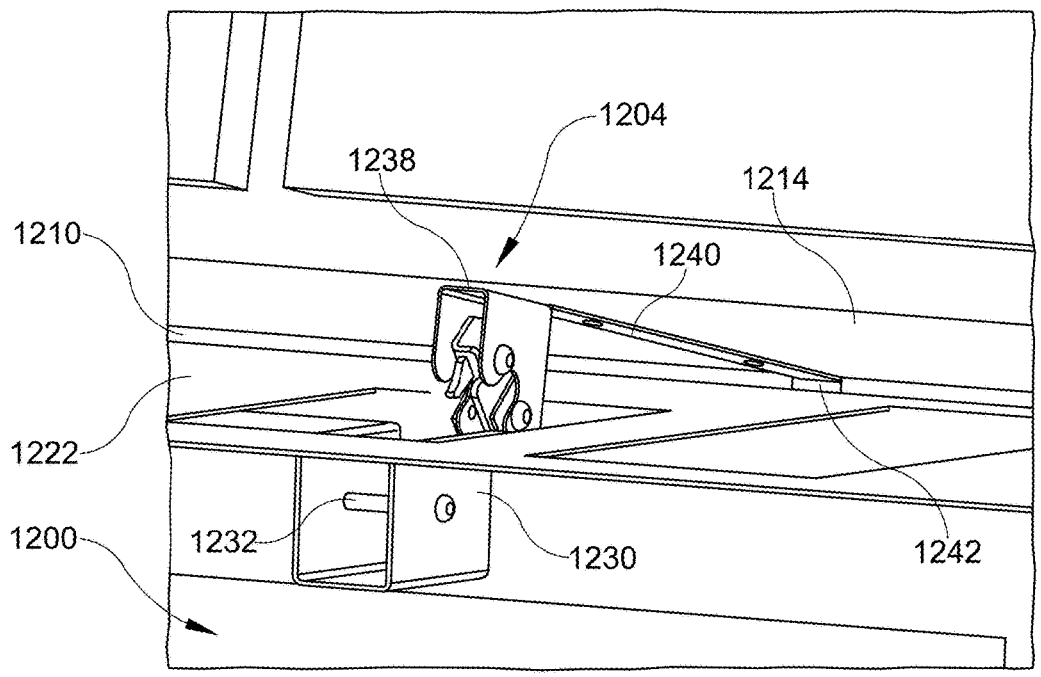

FIGS. 12A-C illustrate still yet another embodiment of a first cooperating latch member 1204 and a second cooperating latch member 1230 (only in FIGS. 12A and 12C). The second cooperating latch member 1230, which may contain a bolt 1232 (see FIG. 12C), may be installed within the enclosure 1222 of the microwave 1200. In some instances, such as illustrated in FIG. 12C, the second cooperating latch member 1230 may be recessed within the microwave 1200. The bolt 1232 in the illustrated embodiment is horizontal, or substantially parallel with the microwave 1200. This horizontal orientation of bolt 1232, when in combination with a flat, 180 degree, connection surface 1238 of the first cooperating latch member 1204, may minimize the need for an adjustment screw described previously. In this embodiment, the spacing between top-facing side of the enclosure 1222 of the microwave 1200 and the underside of a wall cabinet 1214 is predefined by the first and second cooperating latch members 1204, 1230. Furthermore, the horizontal bolt 1232 may, in some instances, minimize lateral misalignment of the microwave during installation. The first cooperating latch member 1204 may be installed on the underside of a wall cabinet 1214 and latches with the second cooperating latch member 1230.

Additionally, as illustrated in FIG. 12C, the first cooperating latch member 1204 may additionally include a connection member 1240 that connects the first cooperating latch member 1204 to a wall bracket (not visible in FIG. 12C). In some instances, such as illustrated in FIG. 12C, the connection member 1240 may include an approximately 90 degree bend 1242 at the wall 1210 for a single piece construction. In other instances, the connection member may be formed of a multiple pieces to allow for connection to a wall bracket (not visible in FIG. 12C).

Each of the embodiments illustrated in, and discussed with reference to, FIGS. 8A-B, 9A-C, 10, 11A-B, and 12A-C may require at least one access panel, similar to the access panel 234 illustrated in, and described with reference to, FIG. 4. This access panel(s) may allow an installer or other user to adjust the installation or access the release mechanism of the first and second cooperating latch members to uninstall the microwave, for example through a singular pull string. Additionally, although the first and second cooperating latch members are illustrated singularly, this is not to be understood as limiting; in some instances, the microwave may include two (or more) of each of the first and second cooperating latch members, for example as illustrated in FIGS. 2-5.

As described with reference to FIG. 8, the first cooperating latch member 904, 1004, 1104, 1204 of FIGS. 9A-C, 10, 11A-B, and 12A-C, respectively, may be movable between a first and a second position, relative to the second cooperating latch member 930, 1030, 1130, 1230. In such instances, first cooperating latch member 904, 1004, 1104, 1204 may include a spring or other bias member (not visible) to engage with the second cooperating latch member 930, 1030, 1130, 1230. In some instances, the first cooperating member 904, 1004, 1104, 1204 may be movable between a first position (e.g. ready to engage the second cooperative latch member) to second position (e.g. engaged with the second cooperative latch member) through rotation. In other instances, the movable first cooperating member 904, 1004, 1104, 1204 may slidably move between a first position (e.g. ready to engage the second cooperative latch member) to second position (e.g. engaged with the second cooperative latch member). Once latched, the first cooperating latch member 904, 1004, 1104, 1204 may not be unlatched until actively released by an installer, user, etc. through the access panel(s). In some instances, the first cooperating latch members 904, 1004, 1104, 1204 may be similar to those latches utilized in automobiles.

Although the term "adjustment screw" is used herein, this is not intended to be limited to a screw. In some instances, the adjustment screw may be a bolt; in other instances, the adjustment screw may be any other type of adjustment mechanism known in the art.

It will be appreciated that various additional modifications may be made to the embodiments discussed herein, and that a number of the concepts disclosed herein may be used in combination with one another or may be used separately. Therefore, the invention lies in the claims hereinafter appended.

What is claimed is:

1. A kit for installing an over-the-range cooking appliance to an underside of a wall cabinet, the over-the-range cooking appliance including an enclosure with a cooking cavity configured to receive food, wherein the enclosure includes at least a rear-facing side and a top-facing side, the kit comprising:
   a wall bracket configured to be secured to a wall disposed proximate to the wall cabinet and configured to support the enclosure proximate a bottom of the rear-facing side of the enclosure; and
   a cabinet bracket configured to support the enclosure from the underside of the wall cabinet;
   wherein a first cooperating latch member of the cabinet bracket is mounted on the underside of the wall cabinet and is configured to engage a second cooperating latching member secured to the cooking appliance when the enclosure is supported on the wall bracket proximate the bottom of the rear-facing side thereof and tilted upwardly to inhibit downward tilting of the enclosure after the first and second cooperating latch members are latched to one another; and
   wherein the second cooperating latch member engages the first cooperating latch member along a perpendicular axis of the first cooperating latch member.

2. The kit for installing an over-the-range cooking appliance of claim 1, further comprising a template configured to allow a user to determine a location for holes to be drilled for installation of the wall bracket on the wall or cabinet bracket on the wall cabinet.

3. The kit for installing an over-the-range cooking appliance of claim 1, wherein the wall bracket further includes a lip and the enclosure is supported proximate the bottom of the rear-facing side of the enclosure by the lip of the wall bracket.

4. The kit for installing an over-the-range cooking appliance of claim 1, wherein at least one of the first or second cooperating latch members is a support bolt.

5. The kit for installing an over-the-range cooking appliance of claim 4, wherein the support bolt further includes an engageable head for tightening the support bolt.

6. The kit for installing an over-the-range cooking appliance of claim 1, wherein at least one of the first or second cooperating latch members is a cam.

7. The kit for installing an over-the-range cooking appliance of claim 1, wherein at least one of the first or second cooperating latch members is a cam and at least one of the first or second cooperating latch members is a support bolt.

* * * * *